Patented July 29, 1947

UNITED STATES PATENT OFFICE 2,424,589

PREPARATION OF BETA LACTONES

Thomas R. Steadman, Akron, Ohio, assignor to The B. F. Goodrich Company, New York, N. Y., a corporation of New York No Drawing. Application October 14, 1944, Serial No. 558,745

4 Claims. (Cl. 260—344)

This invention relates to the preparation of beta hydroxy carboxylic acid lactones and pertains more specifically to their synthesis by a reaction between a ketene and a carbonyl compound such as an aldehyde or a ketone.

It has previously been proposed to prepare beta lactones by reacting a ketene with a carbonyl compound in solution in the presence of a Friedel-Crafts type catalyst. Various solvents have been proposed for use in the reaction such as acetone, ethyl ether, methyl ethyl ether, methyl chloride, isopropyl chloride, carbon disulfide, dioxane or the like. In order to be satisfactory, it is necessary that the solvents dissolve not only the ketene but also the carbonyl compound. Since both the ketene and the beta lactones produced are extremely reactive compounds, even at temperatures as low as 0° C., the use of the foregoing materials as solvents for the reaction, because of reactions between the solvents and reactants, leads to the formation of undesirable by-products which contaminate the beta lactones and which prevent complete conversion of the ketenes to the desired product.

I have now discovered, surprisingly enough, that in spite of the great reactivity of the beta lactones they may be successfully employed as solvents for the reaction. Although any beta lactone may be used as the solvent for a reaction between a ketene and a carbonyl compound, use of a beta lactone identical with the one produced in the reaction offers particular advantages; not only is the possibility of side reaction between the ketenes or carbonyl compound and the solvent practically completely eliminated, but the necessity for separating the desired product from the solvent is also eliminated. The amount of solvent which is employed may be varied over a wide range; it is desirable, of course, to use enough so that the heat of reaction is rapidly dispersed and the rate of reaction easily controlled. If the reaction is carried out in a batch process, of course, the amount of solvent present will be continually increased by the production of additional beta lactone. The concentration of the catalyst in the solvent may likewise be varied over a wide range, from less than 0.1% to about 10% or more by weight. Best results are obtained by using from about 0.2 to about 3.0% by weight.

The reactants which may be used in my process include ketenes having the structure

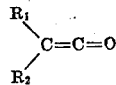

in which $R_1$ and $R_2$ represent hydrogen or hydrocarbon groups, and compounds containing a carbonyl group as the sole functional group, that is, compounds having the structure

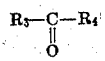

in which $R_3$ and $R_4$ represent hydrogen or hydrocarbon groups free from olefinic and acetylenic bonds. The parent compound, ketene, is usually employed as the ketene in this reaction, but its aliphatic and aromatic homologues, including the aldoketenes such as methyl ketene, ethyl ketene, propyl ketene, butyl ketene, and phenyl ketene, as well as the ketoketenes, such as dimethyl ketene, diethyl kentene, dipropyl ketene, diphenyl ketene, and the like, may also be used. The carbonyl compounds which may be employed fall into two chief classes: first, aldehydes having the structure $R_3$—CHO in which $R_3$ represents hydrogen, an alkyl group (that is, a saturated aliphatic open-chain hydrocarbon group having the formula $C_nH_{2n+1}$), an aryl group (that is, a monovalent aromatic hydrocarbon group whose free valence is directly connected to the aromatic ring), free from olefinic and acetylenic bonds, an aralkyl group (that is, an alkyl group having one or more of its hydrogens replaced by an aryl group), or a cyclo alkyl group (that is, a monovalent hydrocarbon radical derived by the removal of a hydrogen atom from a cycloparaffin); low molecular weight, unsubstituted, saturated aliphatic aldehydes are preferred; second, ketones having the structure

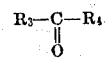

in which both $R_3$ and $R_4$ are alkyl, aryl, aralkyl, or cycloalkyl groups as defined above. Among the aldehydes and ketones which may be employed are formaldehyde, acetaldehyde, propionaldehyde, n-butyraldehyde, isobutyraldehyde, benzaldehyde, phenyl acetaldehyde, hexahydrobenzaldehyde, acetone, methyl ethyl ketone, methyl n-propyl ketone, diethyl ketone, ethyl isopropyl ketone, diethyl ketone, ethyl isopropyl ketone, methyl isobutyl ketone, acetophenone, benzophenone, benzyl methyl ketone, methyl cyclohexyl ketone and other similar compounds.

The reaction is preferably carried out at temperatures below about 30° C. It may be successfully carried out at temperatures as low as —60° C., although the range from about 0° to about 20° C. is usually more convenient. Any catalyst of the Friedel-Crafts type may be employed such as the halides of boron, zinc, aluminum, tin, titanium, and iron, or complexes of these halides with organic compounds such as diethyl ether, ethyl chloride, or the like. Mixtures of the foregoing catalysts may also be employed. Particularly good results have been obtained using mixtures of aluminum halide with minor proportions of zinc halide or zinc and ferric halide, such as a mixture of one part by weight of aluminum chloride with from 0.03 to 0.5 part by weight of zinc chloride. The catalyst is readily dissolved in the beta lactone solvent, preferably at a temperature below about 25° C. The amount of catalyst used may be varied over a wide range, depending upon the particular reactants and catalyst used, as well as upon the temperature of the reaction. As little as 0.05 gram or less of catalyst may be used for each mole of the reactants, although much larger amounts produce no deleterious effect.

The following specific example will serve more fully to illustrate the nature of my invention. Gaseous ketene is prepared by the pyrolysis of acetone vapor with an electrically heated platinum or Nichrome spiral, with reflux of unconverted acetone. The rate of ketene formation is readily controlled by varying the voltage across the pyrolysis coil. Gaseous formaldehyde is obtained by heating solid granular 95% paraformaldehyde by means of a salt bath maintained at 160° to 210° C. The solid polymer is fed from a hopper to the depolymerizer at a predetermined rate by means of a gas tight screw conveyor operated intermittently on a 60-second cycle. The stream of gaseous formaldehyde is carried along through a heated glass tube by a slow but steady flow of nitrogen, is mixed with the stream of ketene, and then led below the surface of a stirred solution consisting of one gram of aluminum chloride and 0.1 gram of zinc chloride dissolved in 200 grams of beta-propiolactone. The reaction mixture is maintained at a temperature of about 5° to 20° C. by means of a water bath, and the reactants are introduced at the rate of approximately 0.5 mole per hour. After a period of six hours, the addition of the reactants is discontinued. The reaction mixture is then distilled at a pressure of 10 mm., the desired beta-propiolactone boiling at 49 to 51° C. at this pressure. If desired, the catalyst may be destroyed by the addition of a small amount of alkali prior to distillation, although this step is not essential. The desired lactone is obtained in excellent yield, and the amount of undesired high-boiling by-products as well as the amount of ketene necessary for a given amount of beta lactone is greatly reduced as compared to the results obtained when the same reaction is carried out in other solvents, such as acetone, for example.

Various modifications in the reaction conditions may be made when reactants other than those given in the specific example are used. For example, many of the higher homologues of ketene and formaldehyde which are not gaseous at ordinary temperatures need not be vaporized before introduction into the reaction mixture. The separation of the lactone from the catalyst may be accomplished by various methods. Because of the tendency of lactones to polymerize when heated at atmospheric pressure, particularly in the presence of catalysts, it may be desirable, in some cases, to destroy the catalyst with a strong alkali before isolation of the product by distillation at reduced pressure, although this step is not essential.

Although I have herein described specific embodiments of my invention, I do not intend to limit myself solely thereto, but to include all of the obvious variations and modifications falling within the spirit and scope of the appended claims.

I claim:

1. In the process of preparing a beta-lactone by reacting a ketene having the structure

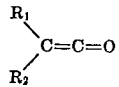

wherein $R_1$ and $R_2$ are members of the class consisting of hydrogen and hydrocarbon groups with a carbonyl compound having the structure

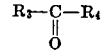

wherein $R_3$ and $R_4$ are members of the class consisting of hydrogen and hydrocarbon groups free from olefinic and acetylenic bonds, the steps which comprise first preparing a solution consisting of a Friedel-Crafts catalyst dissolved in a solvent consisting of a previously prepared beta lactone identical with that obtained in the reaction, and then adding to this solution, while maintaining its temperature below about 30° C., reactants consisting of the ketene and the carbonyl compound, whereupon the ketene and carbonyl compound react to produce additional beta lactone without formation of substantial quantities of other materials.

2. In the process of preparing beta-propiolactone by the reaction of ketene and formaldehyde, the steps which comprise first preparing a solution consisting of a Friedel-Crafts catalyst dissolved in a solvent consisting of previously prepared beta-propiolactone and then adding to the said solution, while maintaining its temperature below about 30° C., ketene and formaldehyde, whereupon the ketene and formaldehyde react to produce additional beta-propiolactone without formation of substantial quantities of other materials.

3. In the process for preparing beta-propiolactone by reacting ketene and formaldehyde, the steps which comprise first preparing a solution consisting of a Friedel-Crafts catalyst dissolved in previously prepared beta-propiolactone and then adding to the said solution, while maintaining its temperature below about 30° C., a stream of gaseous ketene admixed with gaseous formaldehyde, whereupon the ketene and formaldehyde react to produce additional beta-propiolactone without formation of substantial quantities of other materials.

4. In the process of preparing beta-propiolactone by reacting ketene and formaldehyde, the steps which comprise first preparing a solution containing from about 0.1 to 10% by weight of a Friedel-Crafts catalyst comprising aluminum chloride as an essential component dissolved in a solvent consisting of previously prepared beta-propiolactone, and then adding to this solution, while maintaining its temperature below about 30° C., a stream of gaseous ketene admixed with gaseous formaldehyde, whereupon the ketene and formaldehyde react to produce additional beta-propiolactone without formation of the substantial quantities of other materials.

THOMAS R. STEADMAN.

REFERENCES CITED

The following references are of record in the file of this patent:

UNITED STATES PATENTS

| Number | Name | Date |
|---|---|---|
| 2,356,459 | Kung | Aug. 22, 1944 |